United States Patent [19]
Rodarmer et al.

[11] Patent Number: 5,469,875
[45] Date of Patent: Nov. 28, 1995

[54] FLUID LEVEL CONTROL SYSTEM FOR A CONTINUOUS CHEMICAL TREATMENT DEVICE

[75] Inventors: Kenneth W. Rodarmer, Schoolcraft; Louis W. Money, Kalamazoo, both of Mich.

[73] Assignee: Delrod Sales Corporation, Kalamazoo, Mich.

[21] Appl. No.: 253,674

[22] Filed: Jun. 3, 1994

[51] Int. Cl.⁶ .................................................. B08B 3/10
[52] U.S. Cl. ........................... 134/63; 118/417; 134/117; 134/132; 134/151; 134/155
[58] Field of Search .................................. 451/326, 327; 118/417; 209/920; 134/63, 66, 117, 118, 132, 151, 155, 157, 161

[56] References Cited

U.S. PATENT DOCUMENTS

| | | | |
|---|---|---|---|
| 2,222,777 | 11/1940 | Linke | 451/326 X |
| 2,380,881 | 7/1945 | Trostler et al. | 134/118 X |
| 3,422,577 | 1/1969 | McKibben | 451/327 |
| 3,935,680 | 2/1976 | Kobayashi | 451/327 X |
| 3,965,858 | 6/1976 | Burdin | 118/417 |
| 4,001,979 | 1/1977 | Elkins et al. | 451/327 |
| 4,002,488 | 1/1977 | Campanelli | 134/7 |
| 4,981,101 | 1/1991 | Cataldo et al. | 118/417 X |
| 5,117,850 | 6/1992 | Money | 134/63 |

*Primary Examiner*—Philip R. Coe
*Attorney, Agent, or Firm*—Flynn, Thiel, Boutell & Tanis

[57] ABSTRACT

A device for surface treating of parts which includes a base frame with an elongated channel thereon. The channel includes a first end wall at a first end of the channel and a second wall which defines a crosswise extending dam at a second end of the channel remote from the first end, the dam including an inclined ramp extending from the lowest part of a bottom wall to a top of the dam. A drive device is provided for vibrating the channel to cause parts to travel from the first end wall toward the dam whereby the parts rise to a sufficient level in advance of clearance of the dam. A fluid delivery device is provided for spraying a treatment solution toward either the bottom wall or the inclined ramp. A fluid outlet drain is provided for draining the treatment solution introduced into the channel by the fluid delivery device from the channel, the fluid outlet opening into the channel solely through the aforesaid first end wall. An adjustable fluid weir device, connected in fluid circuit with the fluid outlet, is provided for regulating the volume of treatment solution exiting the channel through the fluid outlet and for simultaneously controlling the level of fluid in the channel, the fluid weir allowing the treatment solution to exit so that any contaminants in the treatment solution will flow into the fluid outlet to effect a self-purging of the treatment solution of any contaminants.

23 Claims, 10 Drawing Sheets

FLUID LEVEL CONTROL SYSTEM FOR A CONTINUOUS CHEMICAL TREATMENT DEVICE

FIELD OF THE INVENTION

This invention relates to a device for treating of parts and, more particularly, to a device for surface treating of metallic parts through sequentially arranged stations and preventing following chemical solutions from contaminating leading chemical solutions.

BACKGROUND OF THE INVENTION

It is known to surface treat parts by passing the parts through a treating solution and U.S. Pat. Nos. 5,117,850 and 4,002,488 are representative examples thereof. During surface treatment, such as removing undesired surface characteristics from the parts, or such as coating, dyeing or chemically converting the surface of the parts, the parts usually move through a plurality of treatment stations, each containing a different chemical for treating the surfaces on the parts. A need exists for preventing a following chemical solution from contaminating the leading chemical solution.

Accordingly, it is an object of this invention to provide a surface treating device which allows parts to be treated to pass sequentially through a plurality of serially arranged treatment solutions arranged in a trough with appropriate treatment solution passageways being provided for continuously removing treatment solution with contaminants therein and with a dam being provided between each of the treatment solutions to keep the treatment solutions separated while simultaneously allowing the parts to move up and over the dam.

It is a further object of the invention to provide a surface treating device, as aforesaid, wherein the treatment solution is allowed to exit the trough solely through a wall defining the dam.

It is a further object of this invention to provide a surface treating device, as aforesaid, wherein the level of treatment solution in the surface treating portion of the device is controllable by adjustment of the volume of treatment solution entering the surface treating portion of the device.

It is a further object of the invention to provide a surface treating device, as aforesaid, wherein an elongated basin or trough is provided having a lowest end at one end and a dam at the other end, the dam including an inclined ramp extending from the lowest part of the trough to a top of the dam, both of the inclined ramp and the lowest part of the bottom wall supporting parts thereon which are allowed to travel from the lowest part toward the dam so that the parts can rise to a sufficient level in advance of clearance of the dam while simultaneously spraying treatment solution onto the parts and allowing the excess treatment solution to drain out of the trough through an adjustable fluid weir for regulating the volume of treatment solution exiting the trough and for simultaneously controlling the level of treatment solution in the trough.

It is a further object of the invention to provide a surface treatment device, as aforesaid, wherein the trough is annular and includes an outlet and a gate adjacent the outlet for diverting parts from moving toward a parts outlet and back into the trough and, in addition, wherein the trough includes an outer trough concentric with the inner trough, one end of the outer trough being oriented to receive parts exiting from a parts outlet from the inner trough for movement along a length of the outer trough toward an outlet chute at an end of the outer trough remote from the aforesaid one end.

It is a further object of the invention to provide a surface treatment device, as aforesaid, wherein the trough includes at least one treatment station along the length thereof so that parts moving along the trough will move through the treatment station and be treated by treatment solution thereat.

It is a still further object of the invention to provide a surface treatment device, as aforesaid, wherein the outer trough is composed of a plurality of connectable sections independent of the inner trough and adapted to be assembled as a unit.

It is a still further object of the invention to provide a surface treatment device, as aforesaid, wherein the level of treatment solution is regulatable to "cushion" the fall of parts moving over the dam.

SUMMARY OF THE INVENTION

In general, the objects and purposes of the invention are met by providing a device for surface treating of parts which includes a base frame, an elongated trough having a bottom wall, a pair of spaced upstanding sidewalls on opposite sides of the bottom wall sealingly connected to the bottom wall. The trough includes a first end wall at a first end of the trough sealingly connected to the bottom wall and the pair of sidewalls. A second wall is provided which defines a dam at a second end of the trough remote from the first end, the dam including an inclined ramp extending from the bottom wall to a top of the dam, both of the inclined ramp and bottom wall being sealingly connected to the bottom wall and the pair of sidewalls with the dam extending crosswise of the trough. A drive device is provided for vibrating the trough to cause parts to travel from the first end wall toward the dam whereby the parts rise to a level above a normal level in advance of clearance of the dam. A fluid delivery device is provided for spraying a treatment solution toward either the bottom wall or the inclined ramp. A fluid outlet drain is provided for draining the treatment solution introduced into the trough by the fluid delivery device from the trough, the fluid outlet opening into the trough solely through the aforesaid first end wall. An adjustable fluid weir device connected in fluid circuit with the fluid outlet is provided for regulating the volume of treatment solution exiting the trough through the fluid outlet and for simultaneously controlling the level of fluid in the trough and thereby the depth of the liquid immediately adjacent the dam, the fluid weir allowing the treatment solution to exit so that any contaminants in the treatment solution will flow into the fluid outlet to effect a self-purging of the treatment solution of any contaminants.

BRIEF DESCRIPTION OF THE DRAWINGS

Other objects and purposes of this invention will be apparent to persons acquainted with apparatus of this general type upon reading the following specification and inspecting the accompanying drawings, in which.

DETAILED DESCRIPTION

A surface treating device embodying the invention is illustrated in the drawings. The surface treating device 10 (FIGS. 1–6) includes a base frame 11 having a central upstanding cylindrical frame member 12 and a radially outwardly extending annular plate 13 secured midlength to the exterior surface of the cylindrical frame member 12. A plurality of gusset members 14 serve to connect the exterior surface of the cylindrical frame member 12 to the undersurface of the annular plate 13 to maintain the annular plate 13 in a plane that is generally perpendicular to the central vertical axis through the cylindrical frame member 12. The lower end of the cylindrical frame member 12 is closed off by a wall 16 having a central hole 17 extending therethrough. A shaft of a vibrating drive mechanism M is adapted to be received through the hole 17 in a manner identical to that disclosed in U.S. Pat. No. 5,117,850, reference thereto being incorporated herein by reference.

An annular upstanding wall 18 is, for example, weldably secured to the upper surface of the annular plate 13 and is concentric with the cylindrical frame member 12. The wall 18 is spaced radially outwardly from the exterior surface of the cylindrical frame member 12 so as to define an annular first channel 19 therebetween. A further wall 21 is, for example, weldably secured to the peripheral edge of the annular plate 13. Further, the wall 21 is spaced radially outwardly from the wall 18 and is concentric with both the cylindrical frame member 12 and the annular wall 18. The space between the wall 18 and the wall 21 defines an annular second channel 22. In this particular embodiment, a portion of the wall 21 extends beneath the plane of the annular plate 13 so that a radially outboard edge of the gusset members 14 can be weldably secured thereto to further enhance the rigidity of the base frame 11. A plurality of spring mounts 23 are secured to the underside of the annular plate 13 and are adapted to hold one end of a plurality of coiled springs serving to resiliently support the base frame 11 on a stationary pedestal, such as is illustrated in the aforementioned U.S. Pat. No. 5,117,850.

Figure 10:
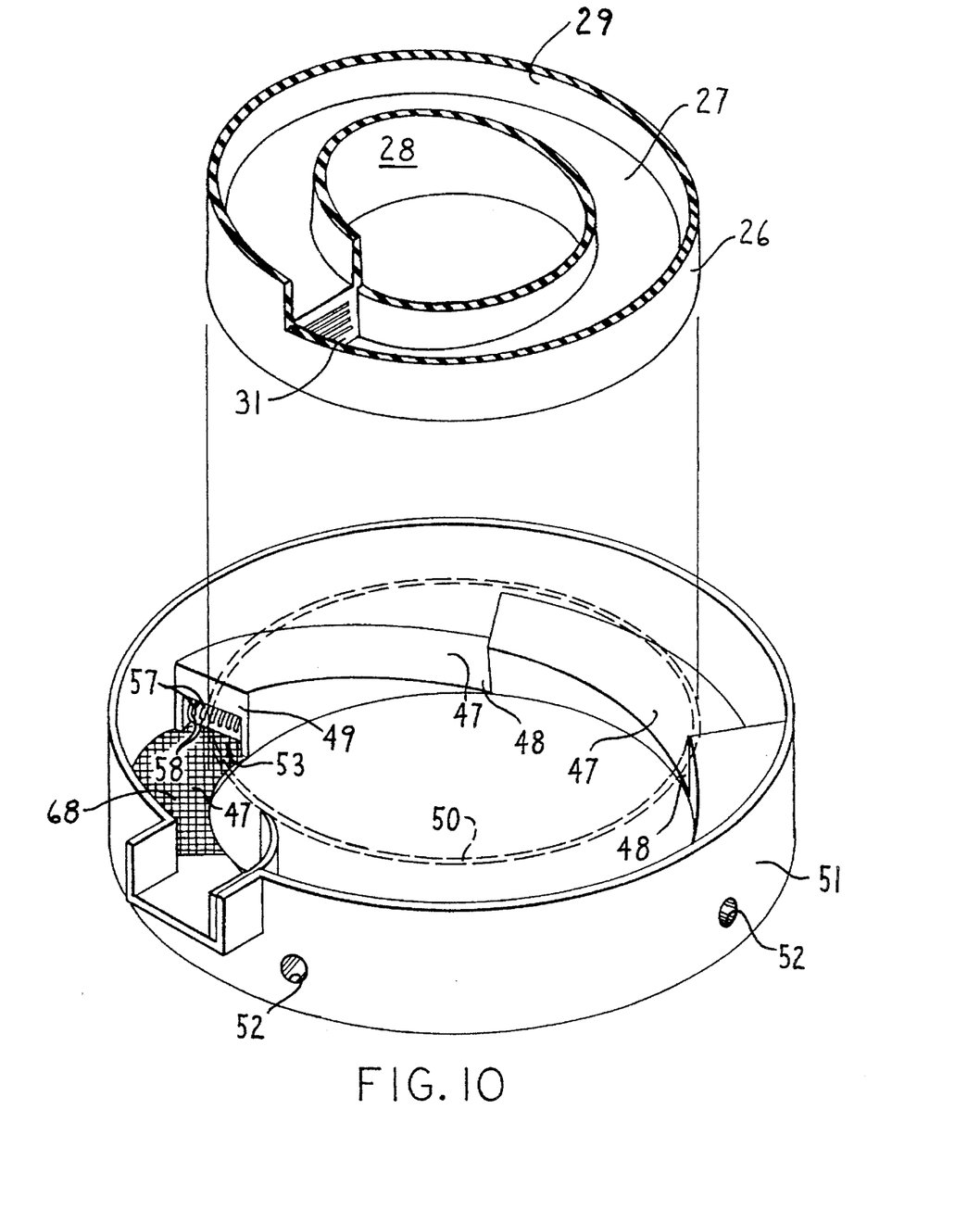
FIG. 10 illustrates that the channel and the trough can be separately manufactured and assembled as a unit.

As shown in FIG. 10, an annular first trough 26 is made of a moldable synthetic resin material or rubber and includes a bottom wall 27 and a pair of upstanding and radially spaced sidewalls 28 and 29 connected to the bottom wall. The bottom wall 27 of the annular first trough 26 is inclined from an end wall 31 around the trough to a point immediately above the end wall 31. The end wall 31 forms a dam. Thus, parts travelling counterclockwise on the bottom wall 27 will move up the inclined ramp or bottom wall 27 and over the dam 31 so as to drop down to the base or lowest level of the bottom wall and again traverse the trough 26. The annular trough 26 is received into the annular first channel 19.

Figure 4:
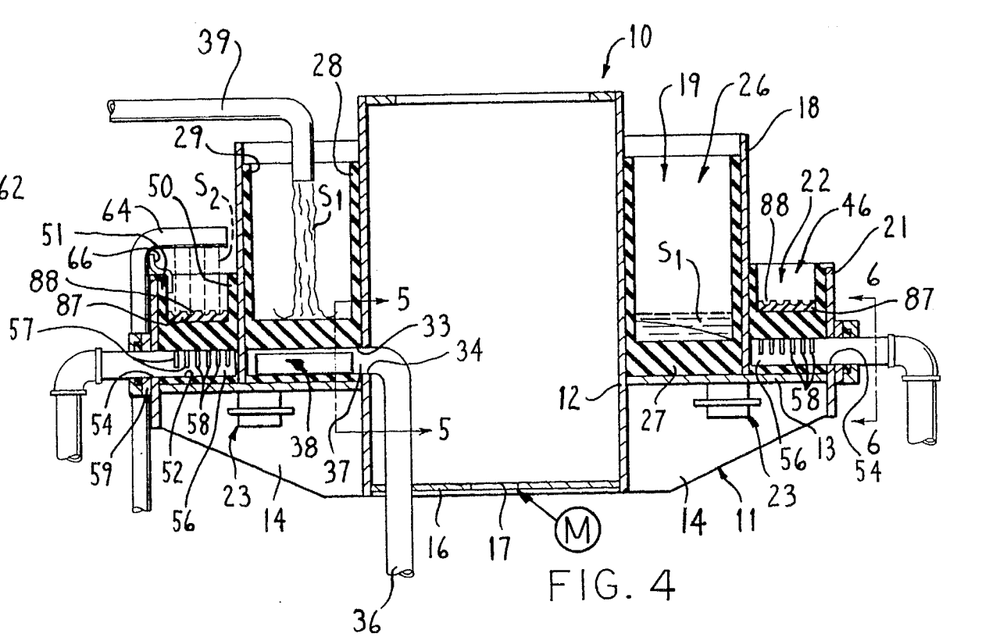
FIG. 4 is a sectional view taken along the line 4—4 of FIG. 1.
Figure 5:
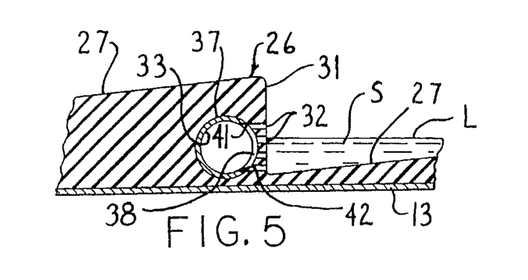
FIG. 5 is a sectional view taken along the line 5—5 of FIG. 4.

The end wall 31 is vertically upright and has a plurality of horizontally extending slits therethrough, which slits are shown in greater detail in FIG. 5. As is further shown in FIG. 5, a laterally extending opening 33 is provided in the interior of the end wall which communicates with the slits 32. Of course, and if desired, a screen mesh (not shown) can be used to cover a single opening, like the opening or cavity 53 shown in FIG. 9 and described below. The opening 33 is axially aligned with an opening 34 provided in the cylindrical wall of the upstanding cylindrical frame member 12 as shown in FIG. 4. A right angle pipe 36 is provided with one leg of the pipe 36 being received into the axially aligned openings 33 and 34. The leg 37 of the pipe 36 has an elongated cutout portion 38 communicating with the slits 32 as shown more clearly in FIG. 5. The cutout portion 38 has an upper lip 41 and a lower lip 42, both lips extending generally parallel to the elongation of the slits 32 in the end wall 31. As the leg 37 is rotated counterclockwise in FIG. 5, the lower lip 42 will function as an adjustable fluid weir by moving upwardly to close off selected lower ones of the slits 32 to regulate the amount of exposure provided by the slits 32 to any liquid that may be contained in the annular trough 26.

Figure 5A:
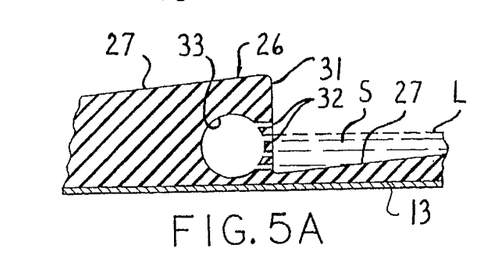
FIG. 5A is an alternate construction of FIG. 5.

As shown in FIG. 5A, the leg 37 of the pipe 36 can, if desired, be eliminated. A sealed connection of the remainder portion of the pipe 36 to the opening 33 is provided to facilitate the exit of treatment solution without leakage. Variation of the level of the treatment solution can be accomplished by varying the flow rate of the treatment solution entering the trough 26 by a valve.

A spigot 39 is provided for introducing treatment solution $S_1$ into the annular trough 26. As a result, treatment solution $S_1$ entering the annular trough 26 will fill the trough adjacent the end wall 31 to the level L (FIG. 5). The inflow rate of treatment solution $S_1$ from the spigot 39 can be independently regulated by a valve, not shown, and, accordingly, the rotated position of the cutout portion 38 in the leg 37 of the pipe 36 can also be controlled to limit the number of slits 32 providing communication of the top surface portion of the treatment solution $S_1$ adjacent the end wall 31 to the interior of the pipe 36 to allow the treatment solution $S_1$ to drain out through the pipe 36.

As is also illustrated in FIG. 10, an annular second trough 46 is provided which has a plurality of inclined bottom wall sections 47, each beginning at a lowest part 48 and terminating at a highest part and a vertically upright end wall or dam 49 arcuately spaced therefrom. The annular second trough 46 also has a pair of upstanding sidewalls 50 and 51 secured to the bottom wall sections 47 and extending upwardly therefrom. The sidewall 51 is spaced radially outwardly from the sidewall 50 and both walls 50, 51 are concentric with the annular first trough 26. The annular second trough 46 is received into the channel 22 as shown in FIG. 4.

The sidewall 51 of the annular second trough 46 has a plurality of holes 52 therethrough as shown in FIG. 10. The holes extend to and communicate with cavities 53 provided in each of the end walls or dams 49 as shown in FIG. 10. The outermost annular wall 21 of the base frame 11 also has a plurality of holes 54 therein which are to be axially aligned with the holes 52. A section of pipe 56 is received through the aligned holes 52 and 54. The end of the pipe 56 that is oriented within the cavities 53 in the end walls 49 includes a plurality of circumferentially extending slits 57 axially spaced along the length of the pipe 56 as shown in FIGS. 4 and 10. The pipe 56 can be rotated about its axis so as to regulate the elevation of the lips 58 of each of the slits 57 from the bottom wall 47 or low part 48 adjacent each of the ends walls 49.

Figure 6:
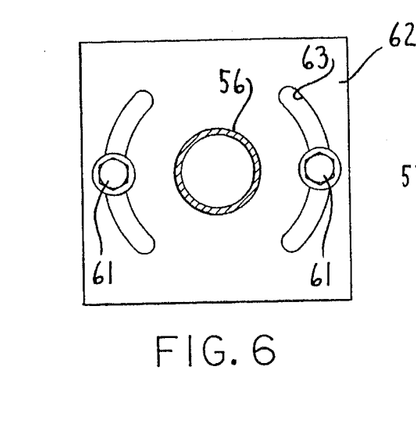
FIG. 6 is a sectional view taken along the line 6—6 of FIG. 4.

The position of the pipe 56 within the openings 52 and 54 can be fixed by any conventional tightening device such as is illustrated in FIG. 6. More specifically, the structure for fixing the position of the pipe 56 in place within the openings 52 and 54 can include a plate 59 secured to the outer surface of the annular wall 21 and encircling the opening 54, which plate 59 has at least a pair of screws 61 threadedly engaged therewith. The pipe can have a flange 62 secured in any convenient manner thereto and rotatable therewith, which flange has at least a pair of arcuate slots 63 adapted to receive the stem portion of the screws 61 therethrough. Thus, as the pipe 56 and the flange 62 coupled thereto are moved about the axis of the pipe 56, the screws 61 will be allowed to move within the arcuate slot 63 to a desired location whereupon the screws can be tightened to clamp the flange 62 to the plate 59 to thereby lock the pipe 56 fixedly in place.

A second treatment solution $S_2$ is introduced into the second annular trough 46 through a spigot 64, the volume of treatment solution $S_2$ entering the annular second trough 46 being controllable by a valve not shown. As the treatment solution $S_2$ collects in the annular second trough 46, particularly at the lowest part 48 on one of the bottom wall sections 47, excess treatment solution $S_2$ will be allowed to exit through the slits 57 in the pipe 56. By rotating the pipe section 56, the elevation of the lips 58 above the upper surface of the bottom wall 47 will determine the level of treatment solution $S_2$ in the annular second trough and to provide the desired amount of cushioning to the parts entering the second annular trough. The spigot 64 can be held to the wall 21 by any conventional means, such as a clip 66.

Figure 1:
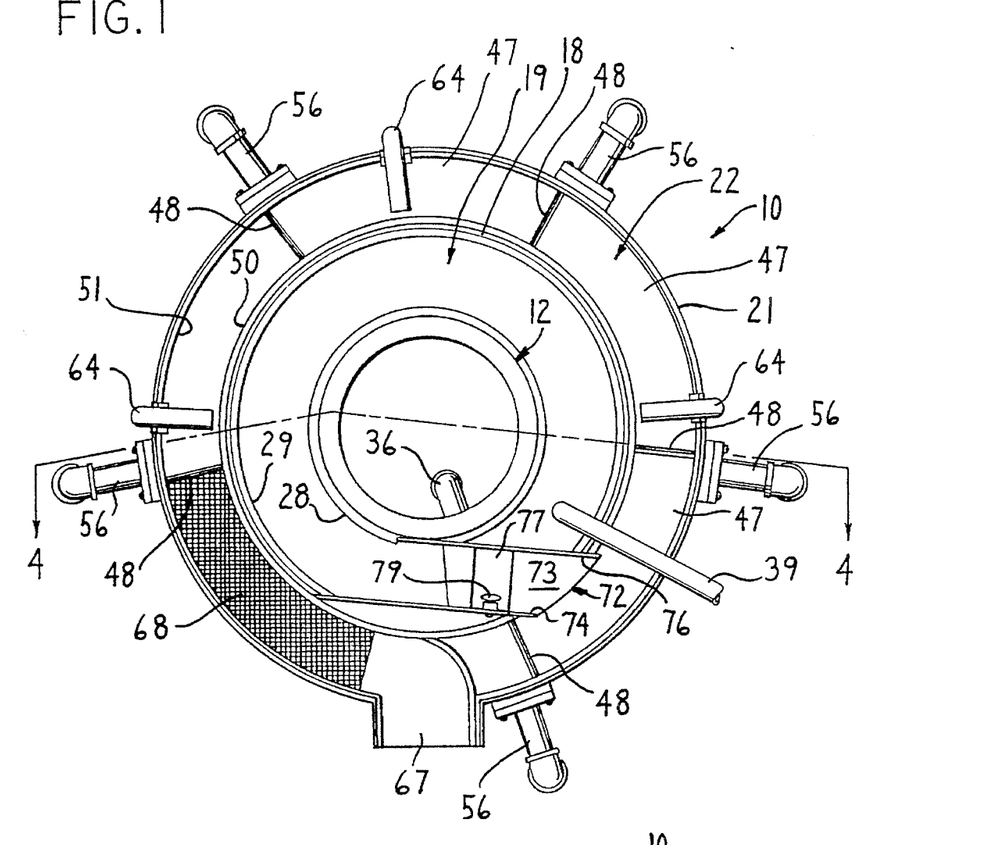
FIG. 1 is a top plan view of a surface treating device embodying the invention.
Figure 2:
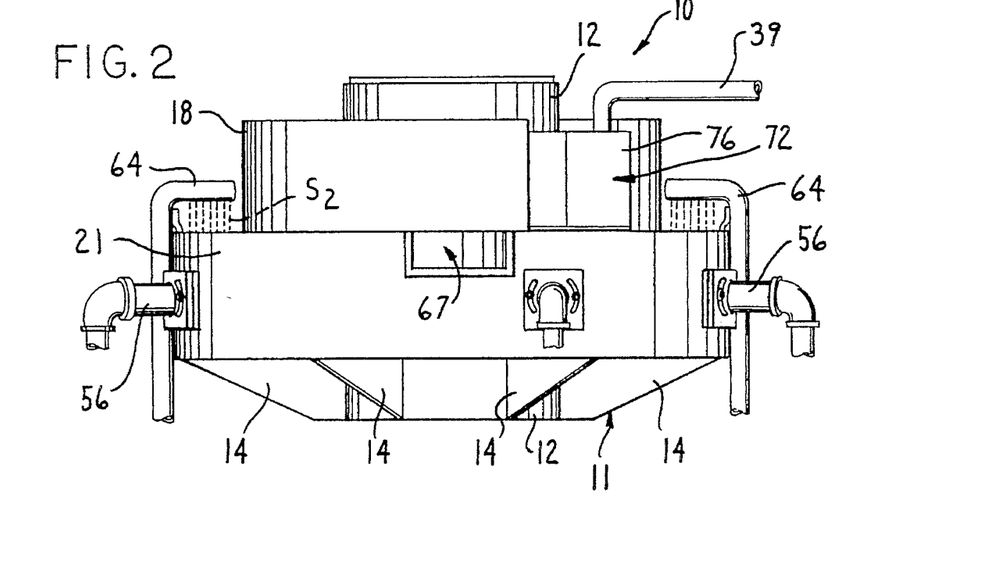
FIG. 2 is a side elevational view of FIG. 1.
Figure 3:
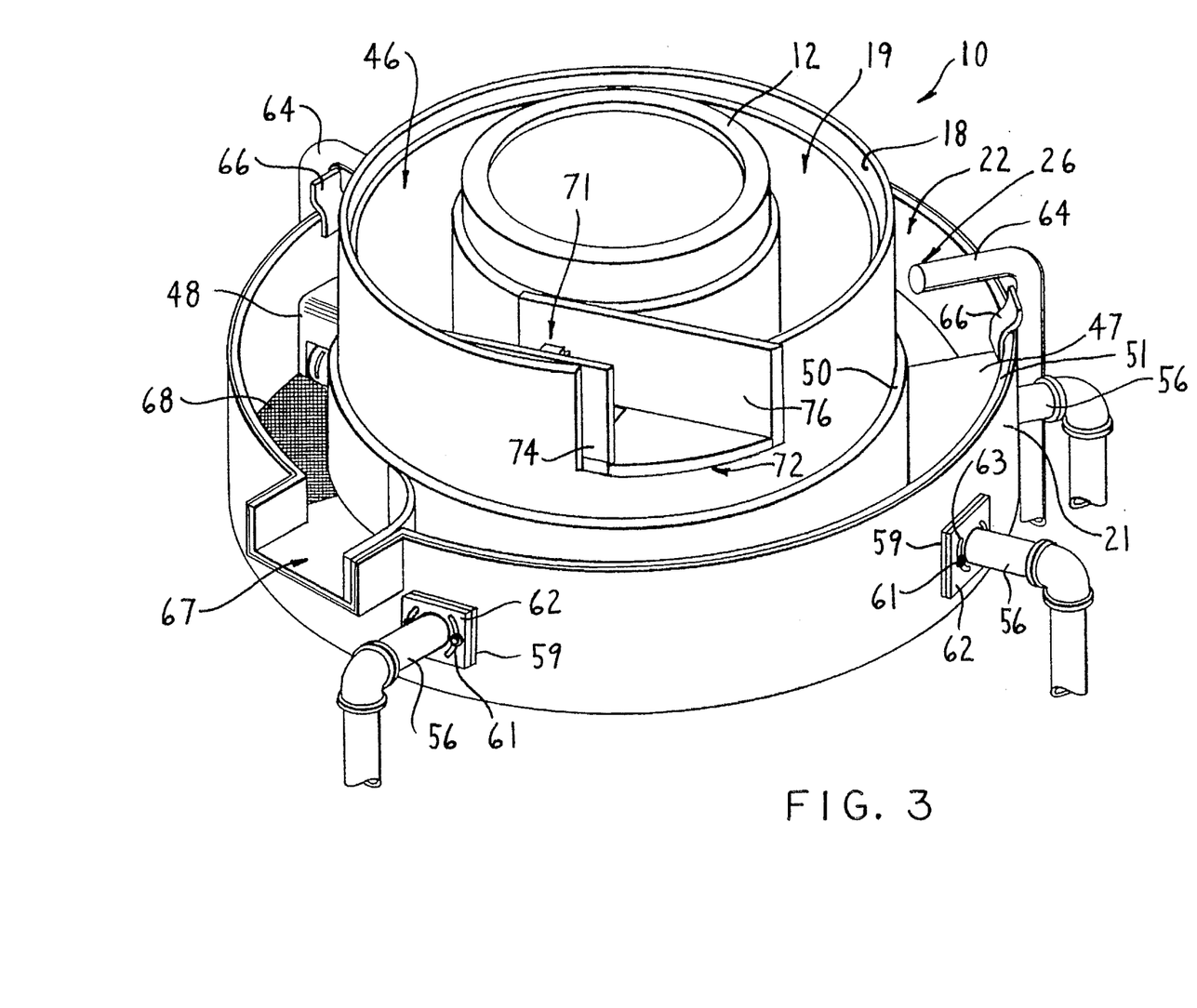
FIG. 3 is a top right isometric view of FIG. 1.

As is shown in FIGS. 1 and 3, the annular second trough 46 terminates in a parts outlet chute 67. A foraminous bottom wall section 68 is provided between the last occurring end wall 49 and the parts outlet chute 67 so as to further rid parts passing thereover of any extraneous treatment solution that may remain thereon.

Further, a gate structure 71 (FIGS. 1 and 15) is provided between the annular first trough 26 and the annular second trough 46. More specifically, a transfer trough 72 is secured to and extends between the exterior surface of the cylindrical frame member 12 and the upstanding annular wall 18 so that the bottom wall 73 of the transfer trough 72 will be flush with the upper surface of the bottom wall 27 adjacent the end wall or dam 31 so that instead of parts dropping back down onto the bottom wall 27, they will exit the annular first trough 26 on the bottom wall 73 between the corresponding sidewalls 74 and 76 and drop down onto the bottom wall 47 of the annular second trough 46. If parts in the annular first trough 26 are to be recirculated, a closure member 77 can be moved from the closed solid line position in FIG. 15 to the broken line open position so that parts will fall through an opening 78 in the bottom wall 72 and down on the upper surface of the bottom wall 27 of the annular first trough 26. A manually operated set screw 79 can be provided to control and hold the position of the closure member 77.

It will be apparent to those skilled in the art that the end wall construction 31 on the first annular trough 26 shown in FIG. 10 can be made to appear identical to the cavity 53 in the end walls or dams 49 of the annular second trough 46 and vice versa. Further discussion in regard to this modification is believed to be unnecessary.

Figures 11, 12:
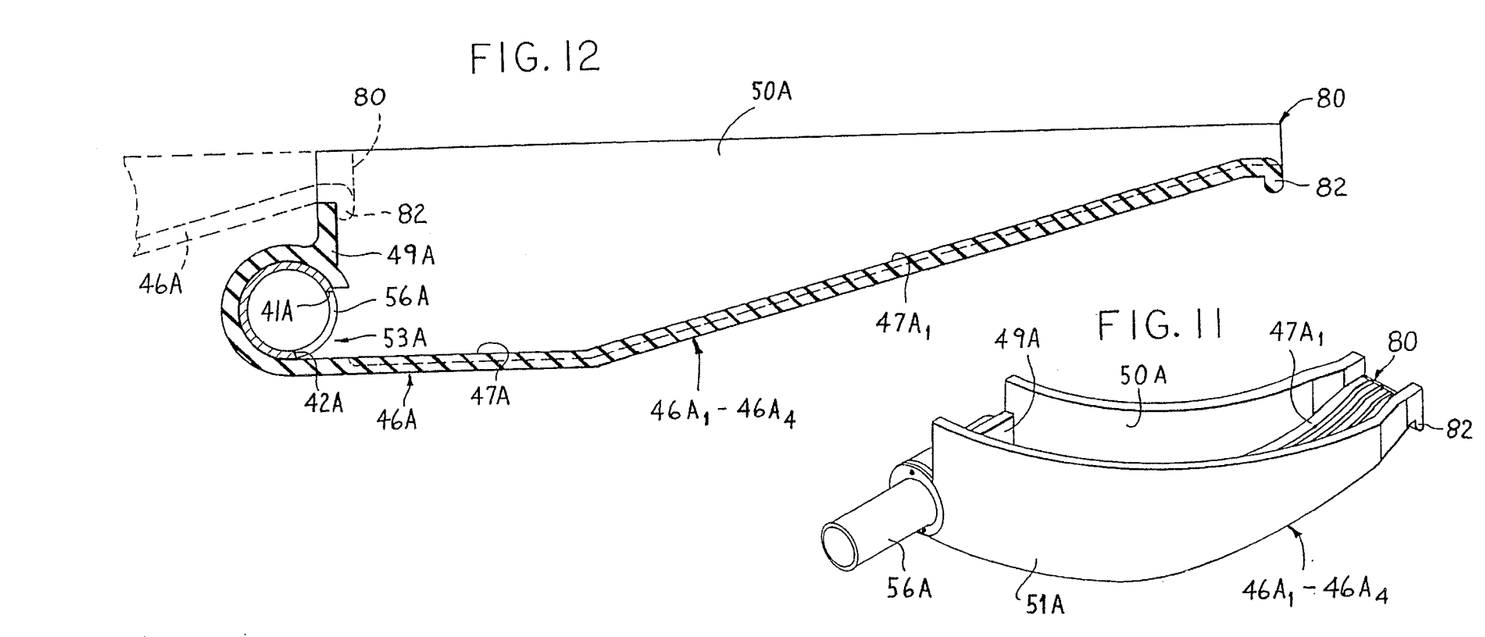
FIG. 11 is an isometric view of a trough segment.
FIG. 12 is a central longitudinal sectional view through the segmented trough illustrated in FIG. 11 and showing a second trough segment connected thereto.

FIGS. 11–13 and 18 illustrate an alternate construction of the annular second trough 46, the alternate embodiment being referenced by the same reference numerals but with the suffix "A" added thereto. The alternate annular second trough 46A is composed of a plurality of segments $46A_1$, $46A_2$, $46A_3$, $46A_4$ and $46A_5$ so as to define a circular path encircling the annular first trough 26. Each of the trough segments $46A_1$–$46A_4$ are identical while the section $46A_5$ (FIG. 18) provides an exit, namely, an outlet chute 81 corresponding to the parts outlet chute 67 described above. FIGS. 11 and 12 show in more detail the trough sections $46A_1$–$46A_4$. Each trough section includes a bottom wall section 47A and, in this particular embodiment, an inclined ramp section $47A_1$. An end wall or dam 49A is provided at one end of the trough sections with the cavity 53A exposing the pipe section 56A. The end 80 of each trough section $46A_1$–$46A_4$, remote from the end walls or dams 49A include a lip construction 82 enabling the end 80 to overlap the upper edge of the end wall or dam 49A on the next mutually adjacent trough section as shown in broken lines in FIG. 12. As with the preceding embodiment, the pipe sections 56A are rotatable in the cavities 53A so as to expose slits corresponding to the slits 57 described above to the cavities to thereby regulate the amount of treatment solution exiting the trough section as well as allowing contaminants to exit with the treatment solution out of the trough section through the interior of the pipe section 56A. As will be evident, plural and different treatment solutions can be utilized in each trough section.

Figure 13:
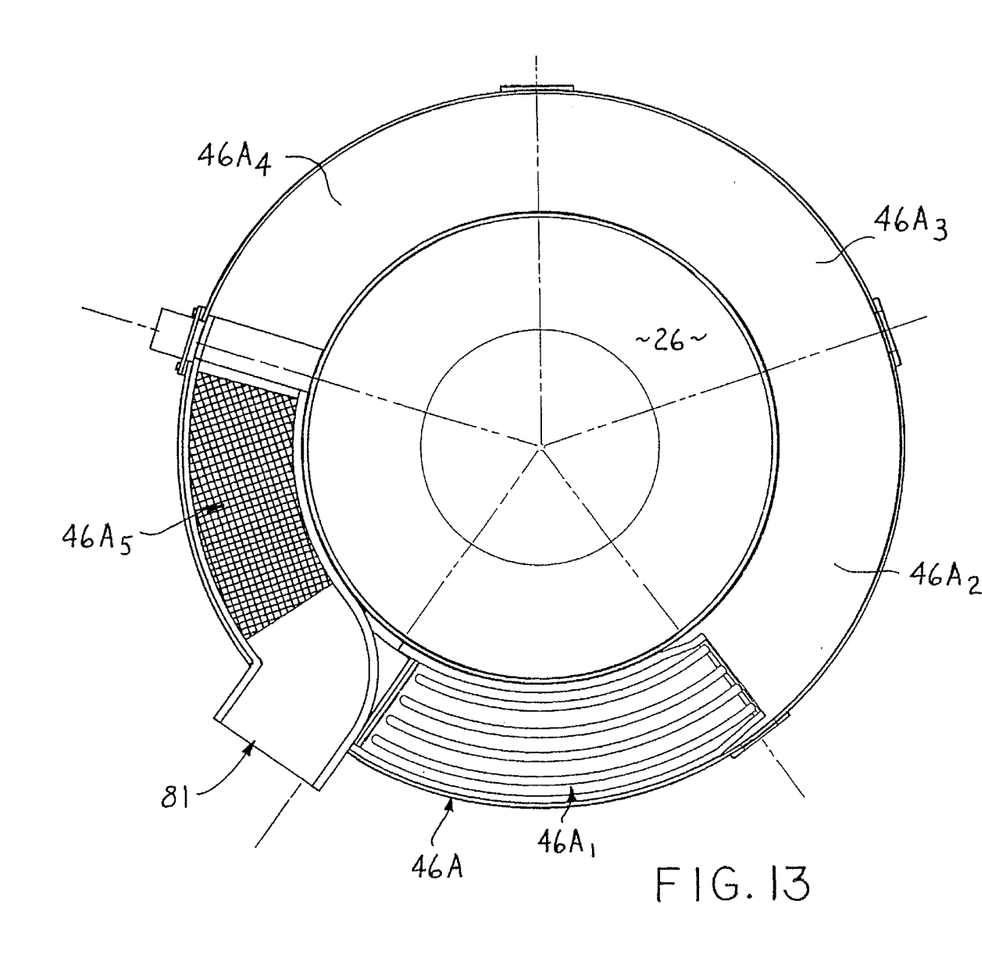
FIG. 13 is a top plan view of the trough segment illustrated in FIG. 11 and demonstrating how a plurality of such trough segments can be united to form an annular trough.
Figure 14:
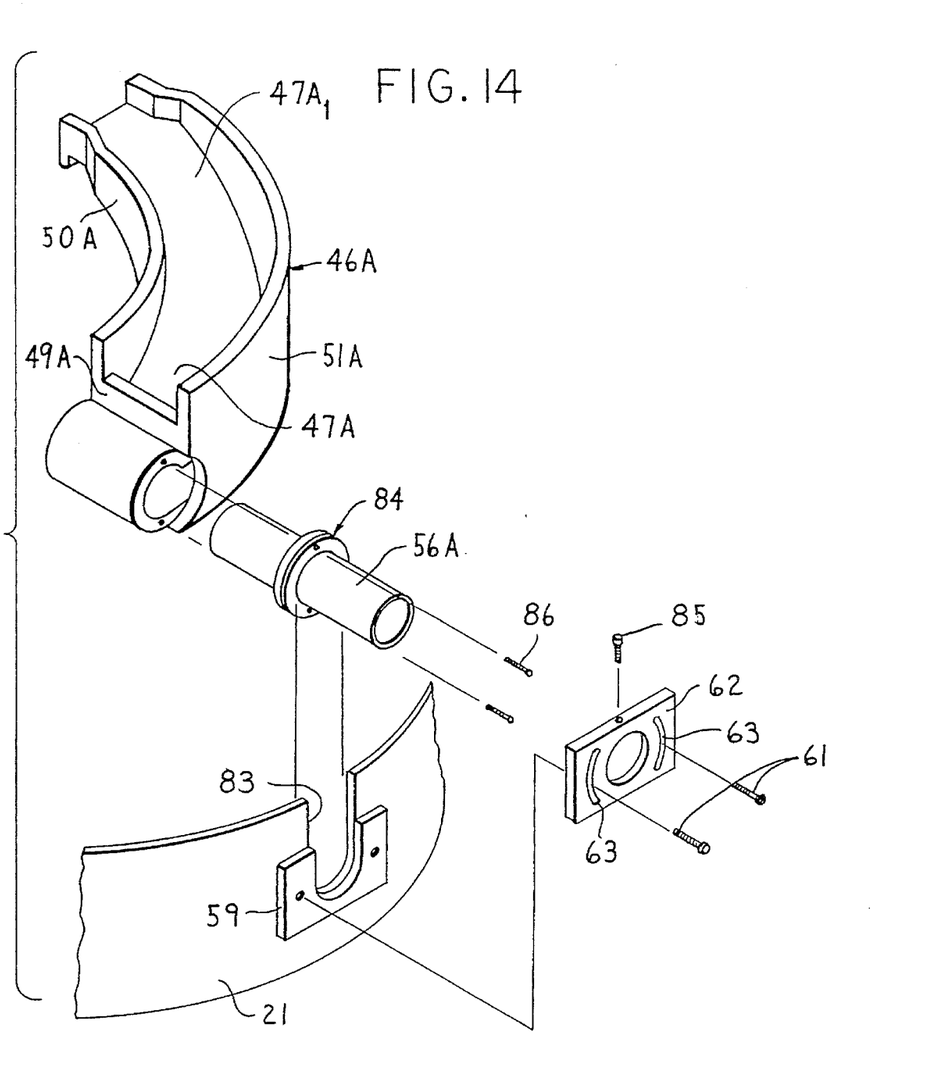
FIG. 14 is an exploded isometric view of a connection of a fluid outlet to a trough segment.

FIG. 14 illustrates that the outer wall 21 of the base frame 11 can be modified to accommodate the trough sections illustrated in FIGS. 11–13 by providing an upwardly opening slot 83 into which is received the pipe section 56A. An appropriate annular seal 84 can be provided around the exterior of the pipe section 56, which annular seal can be secured by plural screws 86 to the trough section 46A. In addition, a set screw 85 can be provided in the flange 62 for locking the flange 62 to the pipe section 56A to enable the flange 62 to rotate with the pipe section 56A as described above.

Figure 7:
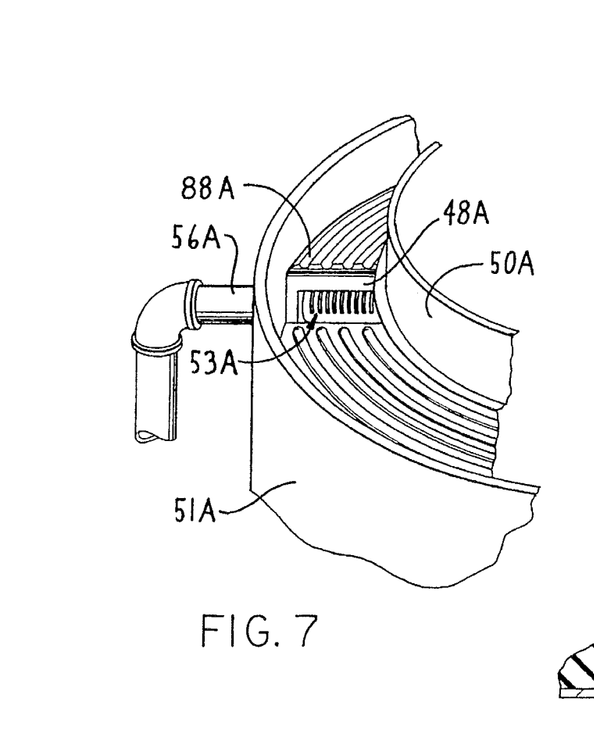
FIG. 7 is an enlarged isometric fragment of a portion of FIG. 3 with grooves being provided in the bottom wall of the trough.

FIG. 4 also shows a bottom wall insert 87 in the annular second trough 46, which bottom wall insert 87 has a plurality of small tracks 88 therein concentric with the central axis of the cylindrical frame member 12. If desired, the small individual tracks 88 can be molded directly into the annular second trough as illustrated at 88A in FIGS. 7, 12 and 13.

Figure 8:
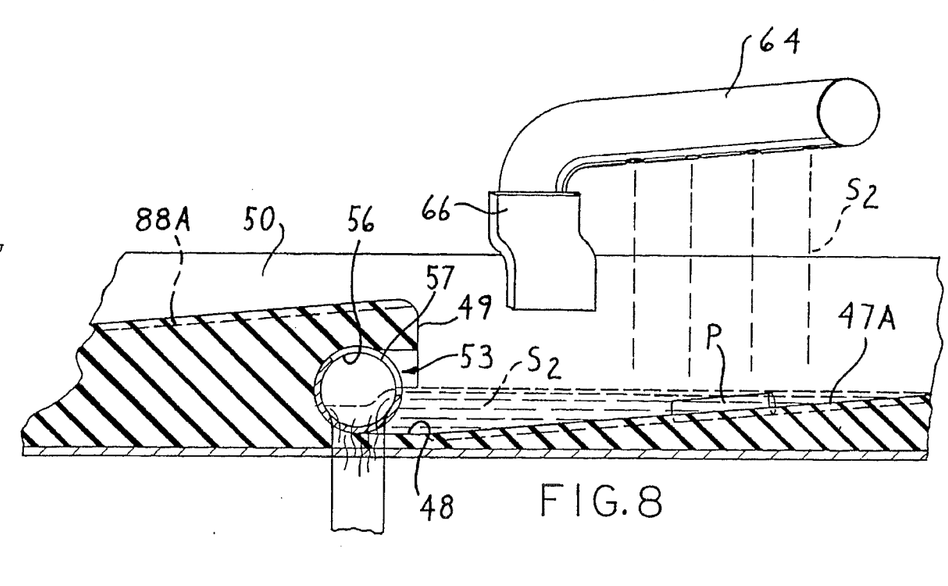
FIG. 8 illustrates a modification of the structure illustrated in FIG. 5.
Figure 9:
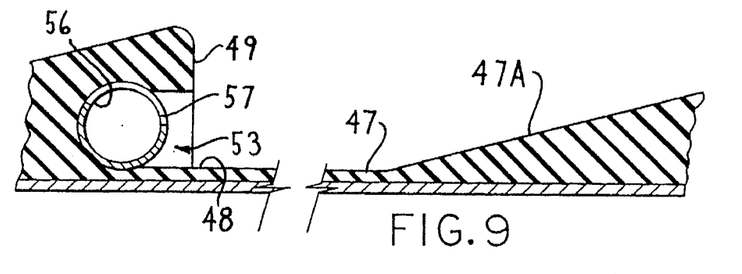
FIG. 9 illustrates a further modification of the structure illustrated in FIGS. 5 and 8.

FIGS. 8 and 9 illustrate that the annular second trough 46 can have either an inclined ramp 47A extending directly from the lowest end 48 toward the next adjacent end wall or dam 49 (FIG. 8) or there can be a flat extent 47 extending away at the lowest end 48 before encountering the inclined ramp 47A. FIG. 8 also illustrates a part P in the form of a cylindrical rod with its axis oriented generally parallel to the upper surface of the inclined ramp 47A as well as generally parallel to the longitudinal extent of the small tracks 88A provided in the upper surface of the inclined ramp 47A.

Figure 16:
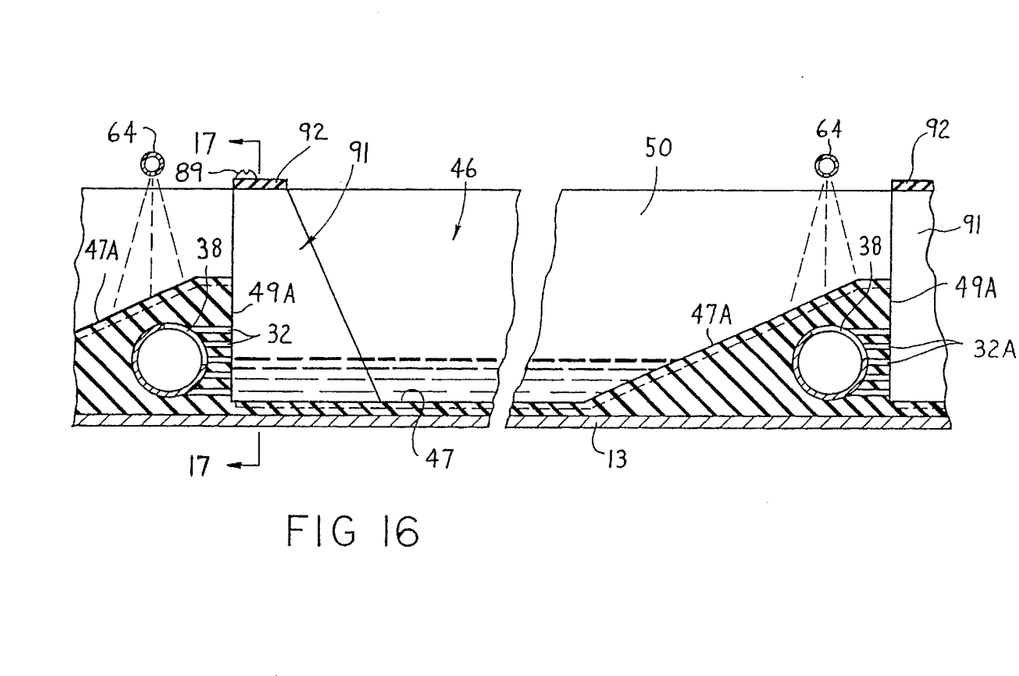
FIG. 16 is an alternate construction of the outer trough having vertical barriers adjacent the dam.
Figure 17:
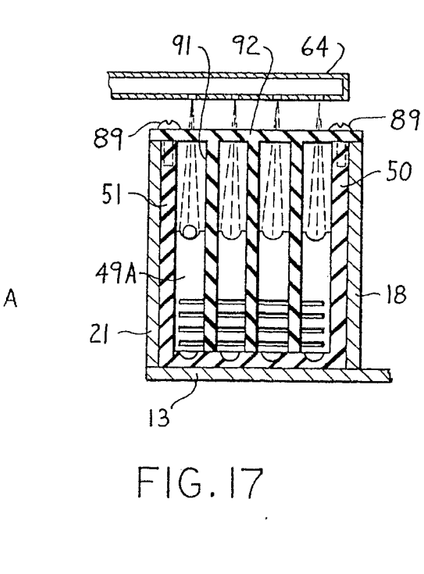
FIG. 17 is a sectional view taken along the line 17—17 of FIG. 16.

FIGS. 16 and 17 illustrate a further embodiment of the surface treating device 10. This particular embodiment includes the provision of barriers 91 oriented between the individual tracks 88A molded into the bottom wall 47, 47A of the annular second trough 46. The plural barriers 91 are connected together by a common connecting piece 92 which extends across the top portion of the barriers 91. Thus, parts P moving up the ramp surface 47A will move over the dam between the barriers 91 in the central portion of the annular second trough 46 and between the barriers 91 and the sidewalls 50, 51 so that the parts as they go over the dam 49A will not fall one on to another but, instead, will be moved away from the end wall 49A as soon as they drop down onto the next adjacent bottom wall surface. Screws 89 (FIGS. 16 and 17) can, if desired, be utilized to secure the common connecting piece 92 to the walls 18 and 21. The mechanism for controlling the level of treatment solution in the trough is the same as in FIG. 5.

OPERATION

Although the operation of the device described above will be understood from the foregoing description by skilled persons, a summary of such description is now given for convenience.

As is described in the aforementioned U.S. Pat. No. 5,117,850, incorporated herein by reference, the desired oscillatory vibration of the annular first and second channels 19 and 22 is achieved by selecting the desired number of weights which are to be piled onto a rotated bracket in order to achieve the desired oscillatory vibration. After the oscillatory vibration characteristic has been achieved, parts P can be introduced into the annular first channel 19 and allowed to move up the inclined bottom wall 27 toward the end wall 37. If it is determined that the treatment solution $S_1$ in the annular channel 19 (first trough 26) is of a sufficient strength to treat the parts in a single pass, the parts can thereafter be delivered through the gate structure 71 and trough 72 into the annular channel 22 (second trough 46). As is shown in FIG. 1, a spigot 39 introduces a first treatment solution $S_1$ into the annular first trough 26. Any contaminants that might be on the parts and removed therefrom by the treatment solution $S_1$ will remain in the treatment solution. Allowing a fluid flow to occur from the point at which the treatment solution $S_1$ is introduced into the annular first trough 26 via the spigot 39 is accomplished by allowing the treatment solution $S_1$ to drain out of the trough through an outlet pipe 36. The level L of fluid in the first trough adjacent the end wall 31 is controlled by adjustable fluid weir, namely, through an appropriate positioning of the cutout portion 38, particularly the elevation of the lip 42 relative to the lowest portion of the bottom wall 27 as, for example, is shown in FIG. 5.

If, on the other hand, further processing of the parts is required in the annular first trough 26, the closure member 77 can be lifted so that the parts will fall through an opening 78 back to the beginning of the annular first trough 26 for recirculation purposes.

Figures 15, 18:
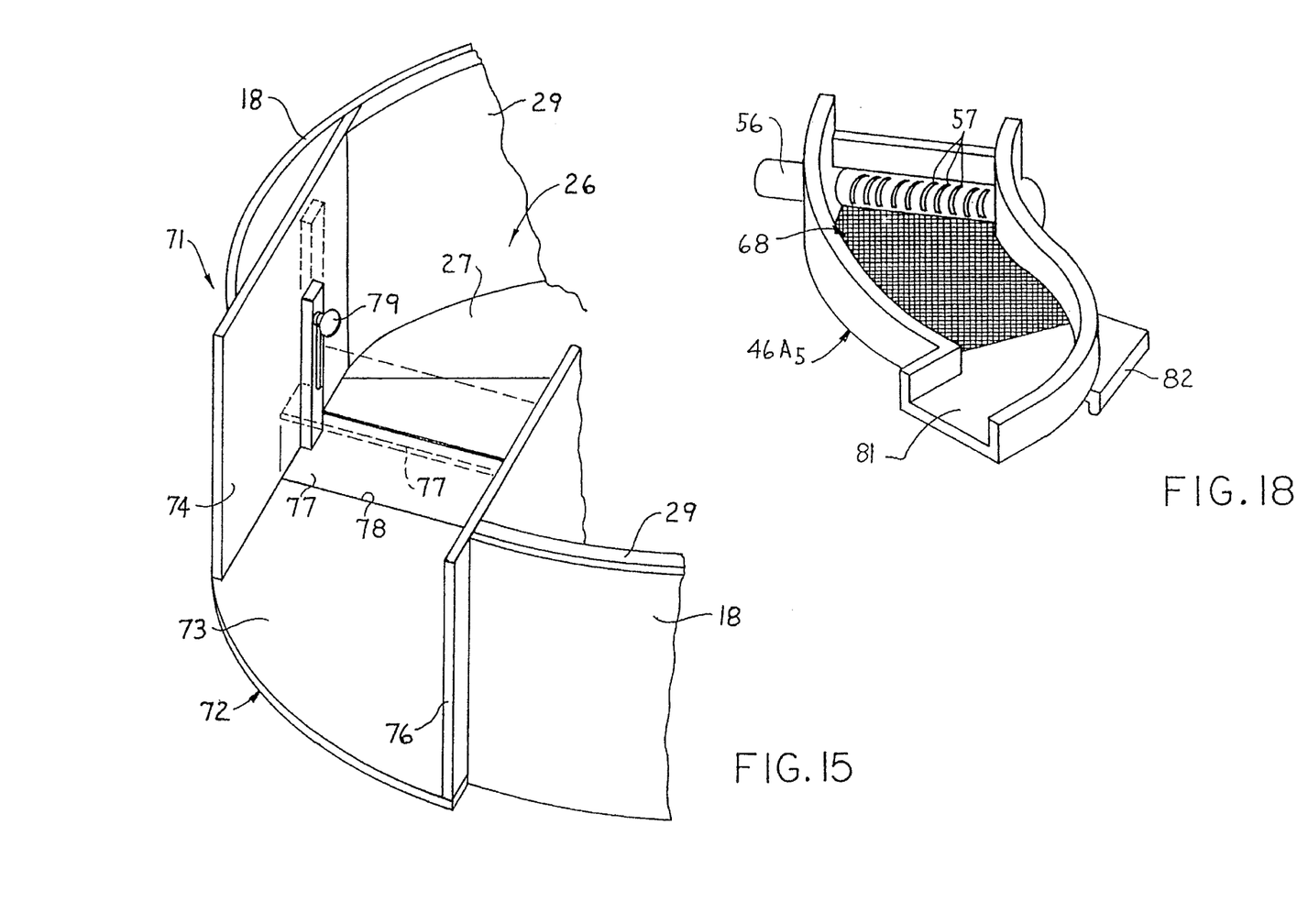
FIG. 15 is an isometric fragment of a gate controlling parts movement between the annular inner trough and an outer trough encircling the inner trough.
FIG. 18 is an isometric view of a trough segment like in FIG. 11 but showing a parts outlet chute.

At the conclusion of treatment in the annular first trough 26, the closure member 77 can be moved to the closed solid line position illustrated in FIG. 15 so that the parts will move across the top of the closure member 77 and into the beginning portion of the annular second trough 46. As is shown in FIGS. 1 and 10, a plurality of treatment stations each having an inclined bottom wall 47 thereon is provided in the annular second trough 46 so that the parts will sequentially pass through the plural treatment stations. FIG. 1 shows that each treatment station in the second trough 46 has a treatment solution supply spigot 64 thereat supplying treatment solution $S_2$–$S_n$ to the various treatment stations. The liquid level in each treatment station is controlled by an adjustable fluid weir in a manner similar to that described for the annular first trough 26, namely, the outlet pipe 56 is rotated until the appropriate lips 58 of the slits 57 are at the appropriate elevated position relative to the lowermost point 48 of the bottom wall sections 47. Treatment solution $S_2$–$S_n$ will be allowed to pass through the weir, namely over the lips 58 and through the slits 57 into the interior of the pipe 56 so as to be drained away therefrom. As a result, any contaminants that may be in such fluid will be caused to flow from the spigot 64 toward the outlet drain by reason of the current flow being in that direction.

If a screen mesh is used and is oriented in front of a single opening or cavity, such as in front of the cavity 53 in FIG. 9, and if no adjustable weir is provided, the level of the treatment solution can be adjusted by an appropriate variation in the flow rate, controlled by a valve, of the incoming treatment solution. In some cases, a variable restriction in the exit passageway for the treatment solution may also be useful.

Thus, it will be readily apparent that the many treatment solutions are each continuously cleansed by reason of the contaminants being moved out through the weirs and associated drain pipes 36 and 56. In other words, the treatment solutions are self-purged so as to keep the treatment solution within a desired specification so as to properly treat the parts moving therethrough. Further, the plural vertically upright walls defining dams 49 over which the parts must travel prevent the following chemical treatment solutions from contaminating a leading chemical treatment solution. The vibrating action of the device and the various treatment solutions will be prevented from mixing together primarily by the height of the vertically upright walls of the dams relative to the liquid level of treatment solution in each treatment station.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A device for surface treating of parts, comprising:

a base frame;

an elongated channel having a bottom wall, a pair of spaced upstanding sidewalls on opposite sides of said bottom wall sealingly connected to said bottom wall;

a first end wall at a first end of said channel sealingly connected to said bottom wall and said pair of sidewalls;

a second end wall defining a dam at a second end of said channel remote from said first end, said dam including an inclined ramp extending from the bottom wall to a top of the dam, said inclined ramp being sealingly connected to said bottom wall and said pair of sidewalls;

drive means for vibrating the channel to cause parts to travel from said first end wall toward said dam and up said inclined ramp;

a fluid delivery means for spraying a treatment solution toward at least one of said bottom wall and said inclined ramp; and a fluid outlet means for draining the treatment solution introduced into said channel by said fluid delivery means from said channel, said fluid outlet means opening into said channel solely through said first end wall.

2. The device according to claim 1, wherein said fluid outlet means includes a plurality of vertically spaced and horizontally elongated slots.

3. The device according to claim 2, wherein said fluid delivery means includes a valve for controlling the rate of flow of treatment solution into said channel and thereby the level of fluid in said channel and thereby the depth of the fluid immediately adjacent the dam.

4. The device according to claim 1, wherein said fluid outlet means includes an adjustable fluid weir means for regulating the volume of treatment solution exiting said channel and for simultaneously controlling the level of fluid in said channel and thereby the depth of the fluid immediately adjacent the dam, said fluid weir means allowing the treatment solution to exit so that any contaminants in the treatment solution will flow into said fluid outlet means to effect a self-purging of the treatment solution of any contaminants.

5. The device according to claim 4, wherein said adjustable weir means includes an elongated section of cylindrical pipe extending crosswise of said channel, said cylindrical pipe having a means defining an opening in a wall segment thereof so as to define a lip extending along a lower edge of said opening; and wherein said adjustable weir means further includes a support means for supporting said cylindrical pipe for rotation about a longitudinal axis thereof, said lip extending generally parallel to said longitudinal axis so that upon a rotation of said pipe, said lip will move vertically to alter the level at which the treatment solution will be permitted to exit said channel.

6. The device according to claim 5, wherein said adjustable weir means includes externally accessible manually engageable means for facilitating the rotation of said pipe.

7. The device according to claim 5, wherein said opening in the wall of said pipe includes a plurality of circumferentially spaced slots each extending generally parallel to said longitudinal axis of said pipe.

8. The device according to claim 5, wherein said opening in the wall of said pipe includes a plurality of longitudinally spaced, circumferentially extending slits oriented in parallel planes perpendicularly intersecting said longitudinal axis, said lip being defined by one circumferential end of each slit.

9. The device according to claim 1, wherein said fluid delivery means sprays treatment solution toward said inclined ramp of said dam.

10. The device according to claim 9, wherein said channel is annular and includes means defining a parts outlet;

wherein said drive means imparts an oscillatory vibration to said annular channel and movement of at least the parts in said channel toward said parts outlet;

wherein said channel includes a gate means adjacent said upper end of said inclined ramp for diverting parts from moving toward said parts outlet and back into said channel adjacent said first end, said treatment solution being retained in said channel by reason of an inability to climb said inclined ramp.

11. The device according to claim 10, wherein said pair of spaced sidewalls of said annular channel includes an inner upstanding cylindrical wall and an outer upstanding cylindrical wall spaced radially outwardly from and concentric to said inner wall; and wherein said base frame includes a further channel secured to said outer upstanding cylindrical wall and encircling said annular channel, one end of said further channel being oriented to receive parts, exiting from said parts outlet, from said annular channel, said drive means also imparting a parts movement along a length of said further channel toward an outlet chute at an end of said further channel remote from said one end.

12. The device according to claim 11, wherein said further channel includes a second bottom wall, a second inner upstanding cylindrical wall and a second outer cylindrical wall spaced radially outwardly from and concentric to said second inner wall, said second inner wall abutting against a radially outer surface of said outer cylindrical wall.

13. The device according to claim 12, wherein said further channel further includes at least one treatment station along the length of said further channel and a second fluid delivery means for spraying a second treatment solution toward said second bottom wall, said further channel further including at least one second fluid outlet means for draining the second treatment solution from said further channel.

14. The device according to claim 13, wherein said further channel further includes at least a pair of end walls;

wherein said second bottom wall includes a second inclined ramp section between said pair of end walls; and wherein said second fluid outlet means includes a second adjustable fluid weir means for regulating the volume of second treatment solution exiting said further channel through said second fluid outlet means and for simultaneously controlling the level of fluid in said further channel.

15. The device according to claim 14, wherein a second adjustable weir means includes an elongated section of cylindrical pipe extending crosswise of said channel, said cylindrical pipe having a means defining an opening in a wall segment thereof so as to define a lip extending along a lower edge of said opening; and wherein said second adjustable weir means further includes a support means for supporting said cylindrical pipe for rotation about a longitudinal axis thereof, said lip extending generally parallel to said longitudinal axis so that upon a rotation of said pipe, said lip will move vertically to alter the level at which the treatment solution will be permitted to exit said channel.

16. The device according to claim 12, wherein said second bottom wall has a plurality of side-by-side grooves extending along a length thereof.

17. The device according to claim 16, wherein said grooves are separated from one another by upstanding separating walls.

18. The device according to claim 17, wherein said upstanding separating walls are limited in longitudinal extent to a region adjacent said one end.

19. The device according to claim 11, wherein said further channel includes a unitary insert member adapted to be inserted as a unit into said further channel.

20. The device according to claim 11, wherein said further channel includes a plurality of insertable arcuate trough sections sealingly connected to one another end-to-end and received in said further channel to encircle said annular channel.

21. The device according to claim 20, wherein each trough section is made of at least one of a moldable synthetic resin and a moldable rubber and integrally includes said second fluid outlet means in each of said trough sections.

22. The device according to claim 11, wherein said annular channel and said further channel are both made of at least one of a moldable synthetic resin and a moldable rubber.

23. The device according to claim 11, wherein said annular channel includes an insertable trough made of at least one of a moldable synthetic resin and a moldable rubber lining the walls of said annular channel.

* * * * *